(12) United States Patent
Sakurai

(10) Patent No.: US 8,381,595 B2
(45) Date of Patent: Feb. 26, 2013

(54) PRESSURE DETECTING DEVICE

(75) Inventor: Toshinobu Sakurai, Kami Ina Gun (JP)

(73) Assignee: Seiko Epson Corporation (JP)

( * ) Notice: Subject to any disclaimer, the term of this patent is extended or adjusted under 35 U.S.C. 154(b) by 159 days.

(21) Appl. No.: 13/051,053

(22) Filed: Mar. 18, 2011

(65) Prior Publication Data

US 2011/0232387 A1 Sep. 29, 2011

(30) Foreign Application Priority Data

Mar. 25, 2010 (JP) ................................. 2010-071112
Feb. 18, 2011 (JP) ................................. 2011-033579

(51) Int. Cl.
*G01L 7/00* (2006.01)

(52) U.S. Cl. .............................. 73/702; 73/703; 331/155

(58) Field of Classification Search ........................ None
See application file for complete search history.

(56) References Cited

U.S. PATENT DOCUMENTS

| 4,754,646 | A | * | 7/1988 | EerNisse et al. | ............... | 73/702 |
| 5,231,880 | A | * | 8/1993 | Ward et al. | ............... | 73/702 |
| 2010/0132471 | A1 | * | 6/2010 | Hedtke et al. | ............... | 73/702 |
| 2011/0074515 | A1 | * | 3/2011 | Yoshida | ............... | 331/155 |
| 2012/0096945 | A1 | * | 4/2012 | Sato | ............... | 73/723 |

FOREIGN PATENT DOCUMENTS

| JP | 53-2097 | 1/1978 |
| JP | 02-143132 | 6/1990 |
| JP | 03-243840 | 10/1991 |
| JP | 06-4306 | 2/1994 |
| JP | 2742642 | 2/1998 |
| JP | 2005-197946 | 7/2005 |
| JP | 3931124 | 3/2007 |
| JP | 2007-327922 | 12/2007 |

OTHER PUBLICATIONS

Jun Watanabe et al. "High Accuracy Pressure Sensor Using Quartz Dual Tuning Fork Resonator", The 38th EM Symposium, pp. 21-26, May 14, 2009.

Jun Watanabe et al. "High Accuracy Pressure Sensor Using Quartz Dual Tuning Fork Resonator".

* cited by examiner

*Primary Examiner* — Andre Allen
(74) *Attorney, Agent, or Firm* — Harness, Dickey & Pierce, P.L.C.

(57) ABSTRACT

A pressure detecting device includes: a resonator whose oscillation frequency varies depending on a pressure; a first oscillation circuit that oscillates the resonator and outputs a signal of a frequency corresponding to the pressure; an AT-cut quartz crystal resonator; a second oscillation circuit that oscillates the AT-cut quartz crystal resonator and outputs a reference clock signal; a measuring unit that measures the reference clock signal by the use of a reciprocal counting method; a temperature detecting unit that detects a temperature of the resonator; and a storage unit that stores coefficients of a first approximating polynomial for calculating a first correction value used to compensate for a frequency-temperature characteristic of the measuring unit, wherein the frequency-temperature characteristic of the value measured by the measuring unit includes a frequency-temperature characteristic of the AT-cut quartz crystal resonator and a frequency-temperature characteristic of the resonator.

7 Claims, 13 Drawing Sheets

PRESSURE DETECTING DEVICE

BACKGROUND

1. Technical Field

The present invention relates to a pressure detecting device.

2. Related Art

JP-A-2007-327922 discloses a pressure sensor including a diaphragm, a container, and a double-ended tuning fork type resonator (pressure-sensitive element) mounted on a support portion of the diaphragm.

In such a pressure sensor, a flexible diaphragm is deformed with a pressure applied to a pressure-receiving face, tensile stress (extensional stress) or compressive stress is applied to two vibration beams of a double-ended tuning fork type resonator, and the magnitude of the pressure applied to the pressure sensor is detected by measuring the oscillation frequency (resonance frequency) of the double-ended tuning fork type resonator which varies depending on the tensile stress or the compressive stress.

In the pressure sensor, when a double-ended tuning fork type resonator using quartz crystal as a base material is used as a pressure-sensitive element, a quartz crystal wafer called Z plate and cut perpendicular to the Z axis is typically used as a quartz crystal substrate.

Paying attention to the frequency-temperature characteristic of the double-ended tuning fork type resonator, the frequency-temperature characteristic of the double-ended tuning fork type resonator is equivalent to the frequency-temperature characteristic of a tuning fork type resonator. Regarding the relation between the frequency-temperature characteristic and the cut angle of the tuning fork type resonator, as described in JP-A-2005-197946, it has been known that the cut angle of the quartz crystal substrate is an angle $\theta$ (where $\theta$ is in the ranges of 0 to $\pm 15°$, $15°$ to $25°$, $30°$ to $60°$, and the like) by which the XY plane (Z plate) is rotated about the X axis, the resultant tuning fork type resonator vibrates in a flexural vibration mode and the graph representing the frequency-temperature characteristic is a quadratic curve.

Since the frequency-temperature characteristic is expressed by a quadratic curve having a peak in the vicinity of the ordinary temperature, the variation in frequency with the temperature in the vicinity of the ordinary temperature is small.

In order to compensate for the frequency-temperature characteristic of the double-ended tuning fork type resonator in detecting a pressure, a temperature sensor is provided and the detected pressure is corrected on the basis of information from the temperature sensor (for example, see High-precision Pressure Sensor using double-ended tuning fork type crystal resonator (Papers of Epson Toyocom, 38$^{th}$ EM Symposium, May 14, 2009)).

In the pressure sensor, a reference frequency source outputting a reference clock signal is necessary for measuring the oscillation frequency of the double-ended tuning fork type resonator. Since the precision in measuring a pressure depends on the precision of the reference frequency source, a high-precision oscillator such as a temperature-compensated crystal oscillator (hereinafter, referred to as "TCXO") including an AT-cut quartz crystal resonator and a temperature-compensating IC is typically used as the reference frequency source.

The reciprocal counting method described in Japanese Patent Nos. 3931124 and 2742642 is employed as a counting method for measuring the frequency. That is, a gate period corresponding to plural periods of a signal output from an oscillation circuit causing the double-ended tuning fork type resonator as a pressure-sensitive element to oscillate is set, the reference clock signal output from the reference clock oscillator in the gate period is counted, the frequency of the signal output from the oscillation circuit is calculated on the basis of the counted value, and the frequency is converted into a pressure value, whereby the pressure is measured. Accordingly, it is possible to reduce the time required to measure a pressure.

However, in such a pressure sensor, the measurement precision is greatly affected by the frequency of the reference clock signal of the reference clock oscillator. When an error exists in the reference clock signal, the counted value of the reference clock signal in the gate period departs from an appropriate value, thereby lowering the precision in measuring a pressure. When the pressure is constant but the temperature varies, the frequency of the reference clock signal of the reference clock oscillator varies accordingly, thereby further lowering the precision in measuring a pressure.

Accordingly, a high-precision oscillator such as a TCXO including a temperature-compensating IC is used as the reference clock oscillator of the pressure sensor.

When the TCXO is used as the reference clock oscillator, for example, when the ordinary-temperature deviation in the frequency of the reference clock signal of the TCXO is $\pm 2$ ppm (which is a typical value of communication TCXO), the measurement error of the pressure sensor is $\pm 4$ Pa (where the sensitivity of the pressure sensor is 500 ppm/kPa).

For example, when the deviation in frequency of the reference clock signal of the TCXO due to the variation in temperature is $\pm 1$ ppm, the measurement error of the pressure sensor increases by $\pm 2$ Pa and the resultant measurement error is $\pm 6$ Pa.

When the size of the pressure sensor is reduced, the frequency sensitivity (sensitivity) of the pressure sensor to the pressure decreases. Accordingly, the influence of the error of the reference clock signal on the pressure measuring precision increases.

For example, when the sensitivity of the pressure sensor is changed from 500 ppm/kPa to 100 ppm/kPa, the measurement error based on the ordinary-temperature deviation and the measurement error based on the deviation due to the variation in temperature are raised to five times.

Since the TCXO includes the temperature-compensating IC, there is a problem in that the power consumption in the temperature-compensating IC is high and the total power consumption of the pressure sensor is high accordingly.

SUMMARY

An advantage of some aspects of the invention is that it provides a pressure detecting device which can reduce the power consumption and improve the precision in measuring a pressure.

Application Example 1

According to this application example of the invention, there is provided a pressure detecting device including: a resonator whose oscillation frequency varies depending on a pressure; a first oscillation circuit that oscillates the resonator and outputs a signal of a frequency corresponding to the pressure; an AT-cut quartz crystal resonator; a second oscillation circuit that oscillates the AT-cut quartz crystal resonator and outputs a reference clock signal; a measuring unit that measures the reference clock signal in a gate period based on the period of the signal output from the first oscillation circuit by the use of a reciprocal counting method; a temperature detecting unit that detects a temperature of the resonator or around the resonator; and a storage unit that stores coefficients of a first approximating polynomial for calculating a first correction value used to compensate for a frequency-temperature characteristic of the measuring unit. Here, the frequency-temperature characteristic of the value measured by the measuring unit includes a frequency-temperature characteristic of the AT-cut quartz crystal resonator and a frequency-temperature characteristic of the resonator.

According to this configuration, since both the frequency-temperature characteristic of the resonator and the frequency-temperature characteristic of the AT-cut quartz crystal resonator can be compensated for, it is possible to improve the precision in measuring a pressure.

Since the frequency-temperature characteristic of the resonator and the frequency-temperature characteristic of the AT-cut quartz crystal resonator can be inclusively compensated for using the first approximating polynomial, it is possible to simplify calculating processes or controls, compared with the case where the frequency-temperature characteristic of the resonator and the frequency-temperature characteristic of the AT-cut quartz crystal resonator are individually compensated for.

It is possible to lower the power consumption, compared with the case where the TCXO including the temperature-compensating IC is used as the reference clock oscillator.

In the AT-cut quartz crystal resonator, the oscillation frequency (resonance frequency) is higher than that of the tuning fork type resonator or the double-ended tuning fork type resonator. The AT-cut quartz crystal resonator is oscillated to generate a reference clock signal, and the reference clock signal is counted using the reciprocal counting method, whereby the pressure is calculated. Accordingly, it is possible to reduce the time required to measure a pressure.

The first approximating polynomial can be read from the outside of the pressure detecting device and the frequency-temperature characteristic of the value measured by the measuring unit can be externally corrected on the basis of the detection result of the temperature detecting unit. Accordingly, it is possible to reduce the circuit scale of the pressure detecting device, thereby reducing the power consumption.

Application Example 2

In the pressure detecting device, it is preferred that the first correction value is calculated on the basis of the detection result of the temperature detecting unit and the first approximating polynomial, and the pressure detecting device further includes a first correction unit that corrects the value measured by the measuring unit by the use of the first correction value.

According to this configuration, it is possible to correct the frequency-temperature characteristic of the value measured by the measuring unit in the pressure detecting device.

Application Example 3

In the pressure detecting device, it is preferred that coefficients of a second approximating polynomial are stored in the storage unit. In this case, the pressure detecting device may further include a second correction unit that additionally corrects the measured value corrected by the use of the first correction value on the basis of the second approximating polynomial. The second approximating polynomial may be used to additionally correct the measured value corrected by the use of the first correction value so that the resultant value corrected by the second correction unit is proportional to the pressure.

According to this configuration, since the pressure-frequency characteristic of the resonator can be compensated for, it is possible to further improve the measurement precision.

Application Example 4

In the pressure detecting device, it is preferred that the degree of the first approximating polynomial is three or more.

The graph representing the frequency-temperature characteristic of the AT-cut quartz crystal resonator is a cubic curve. Accordingly, it is possible to enhance the measurement precision, compared with the case where the degree of the first approximating polynomial is two or less.

Application Example 5

In the pressure detecting device, it is preferred that the degree of the second approximating polynomial is three or more.

According to this configuration, it is possible to enhance the measurement precision, compared with the case where the degree of the second approximating polynomial is two or less.

Application Example 6

In the pressure detecting device, it is preferred that the AT-cut quartz crystal resonator is disposed in a closed space.

According to this configuration, it is possible to prevent the influence of the variation in pressure on the AT-cut quartz crystal resonator, thereby enhancing the measurement precision.

Application Example 7

In the pressure detecting device, it is preferred that the resonator is a double-ended tuning fork type resonator.

According to this configuration, it is possible to raise the frequency sensitivity to the pressure, thereby providing a high-precision pressure detecting device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a pressure detecting device according to exemplary embodiments of the invention will be described in detail with reference to the accompanying drawings.

First Embodiment

Figure 1:
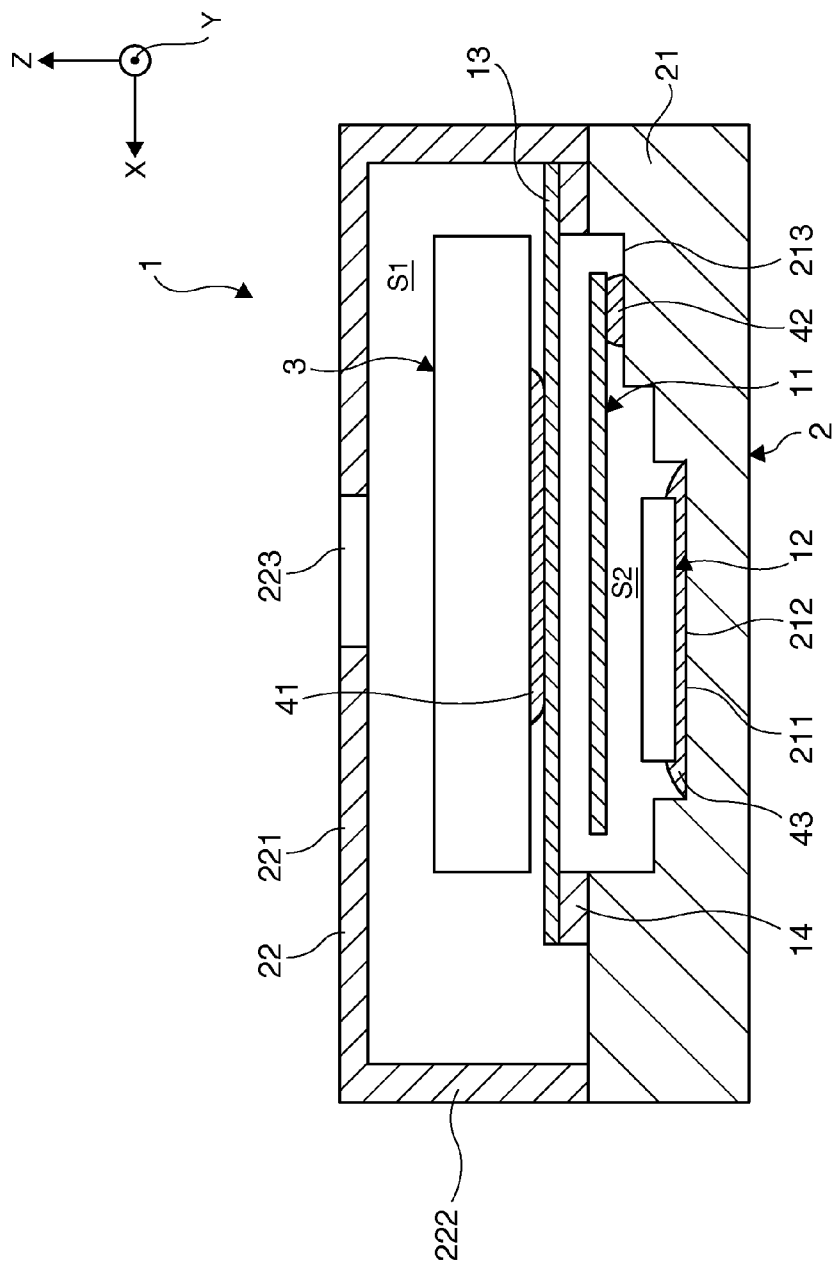
FIG. 1 is a sectional view illustrating a pressure sensor employing a pressure detecting device according to a first embodiment of the invention.
Figure 2:
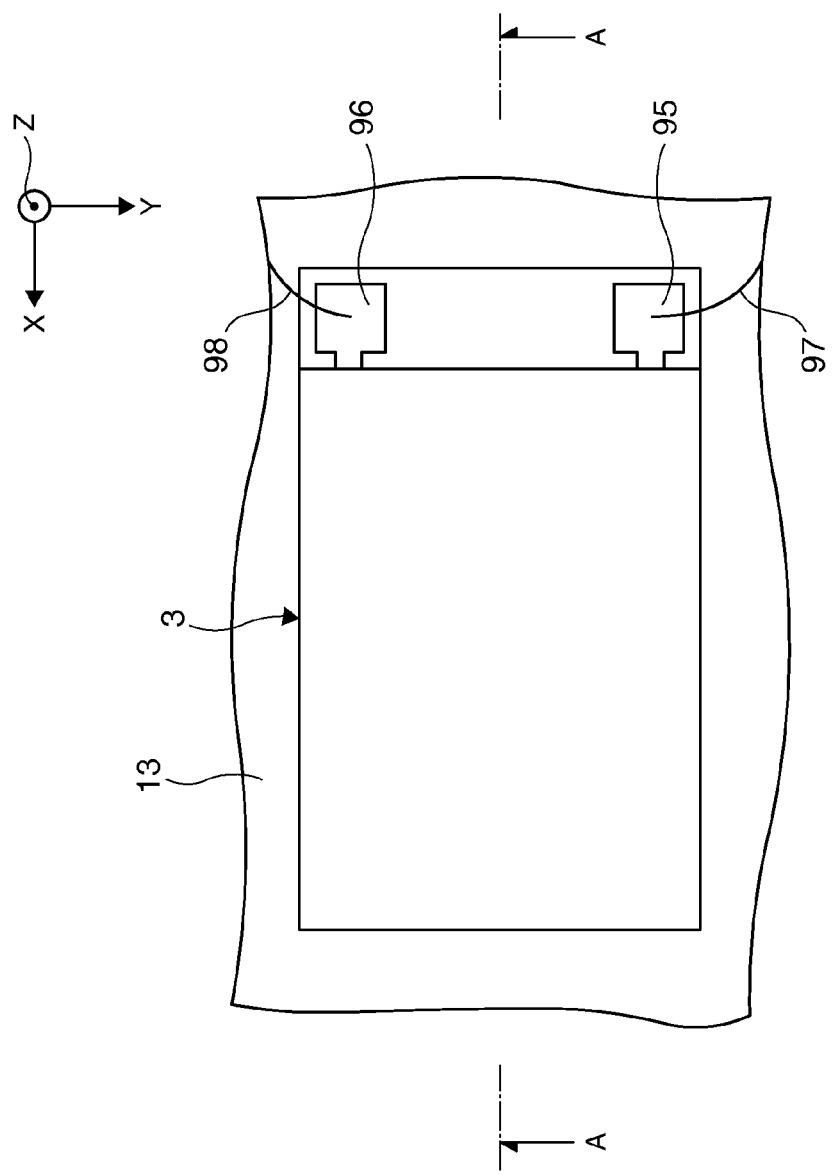
FIG. 2 is a plan view illustrating a sensor chip of the pressure sensor shown in FIG. 1.
Figure 3:
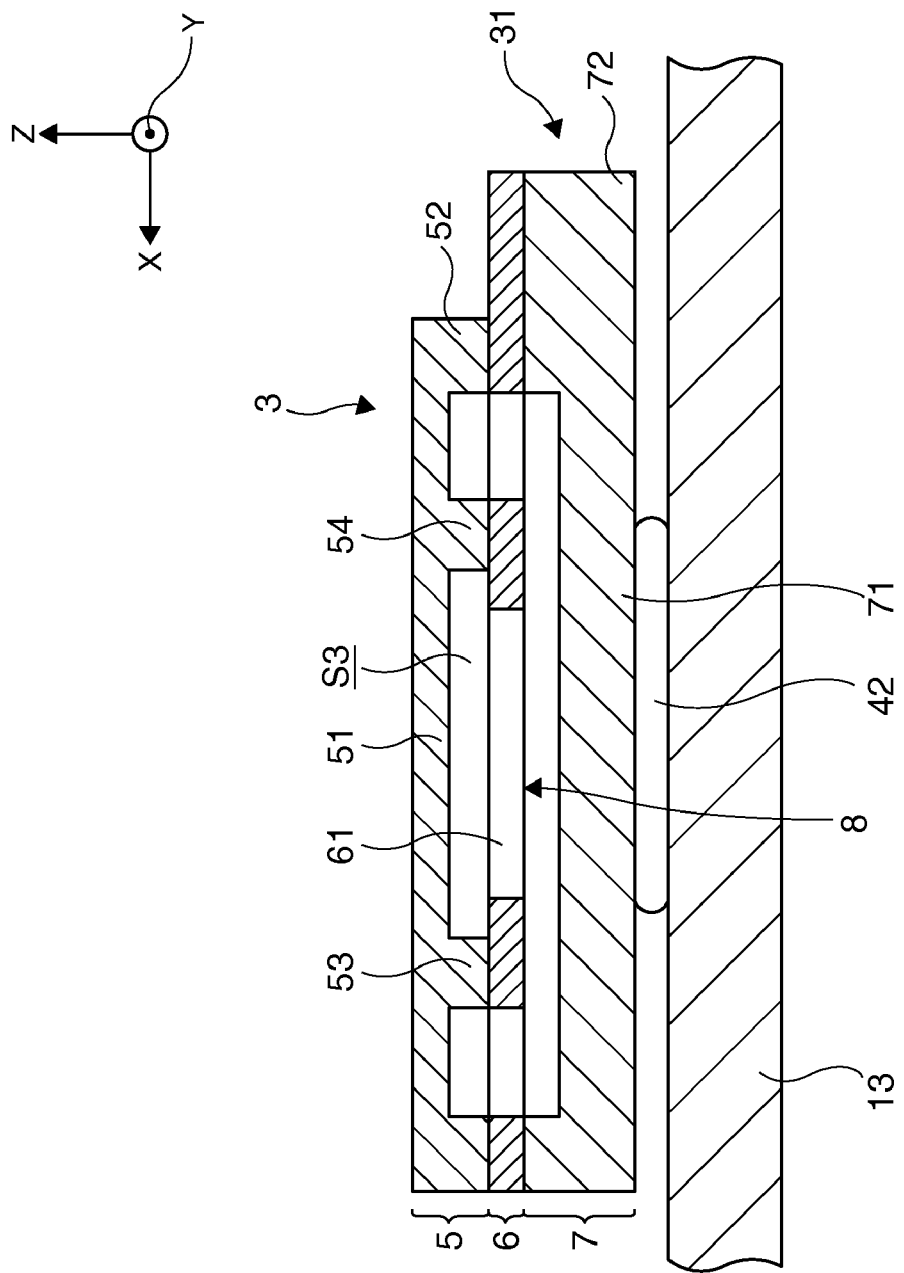
FIG. 3 is a sectional view (a sectional view taken along line A-A of FIG. 2) of the sensor chip shown in FIG. 2.
Figure 4:
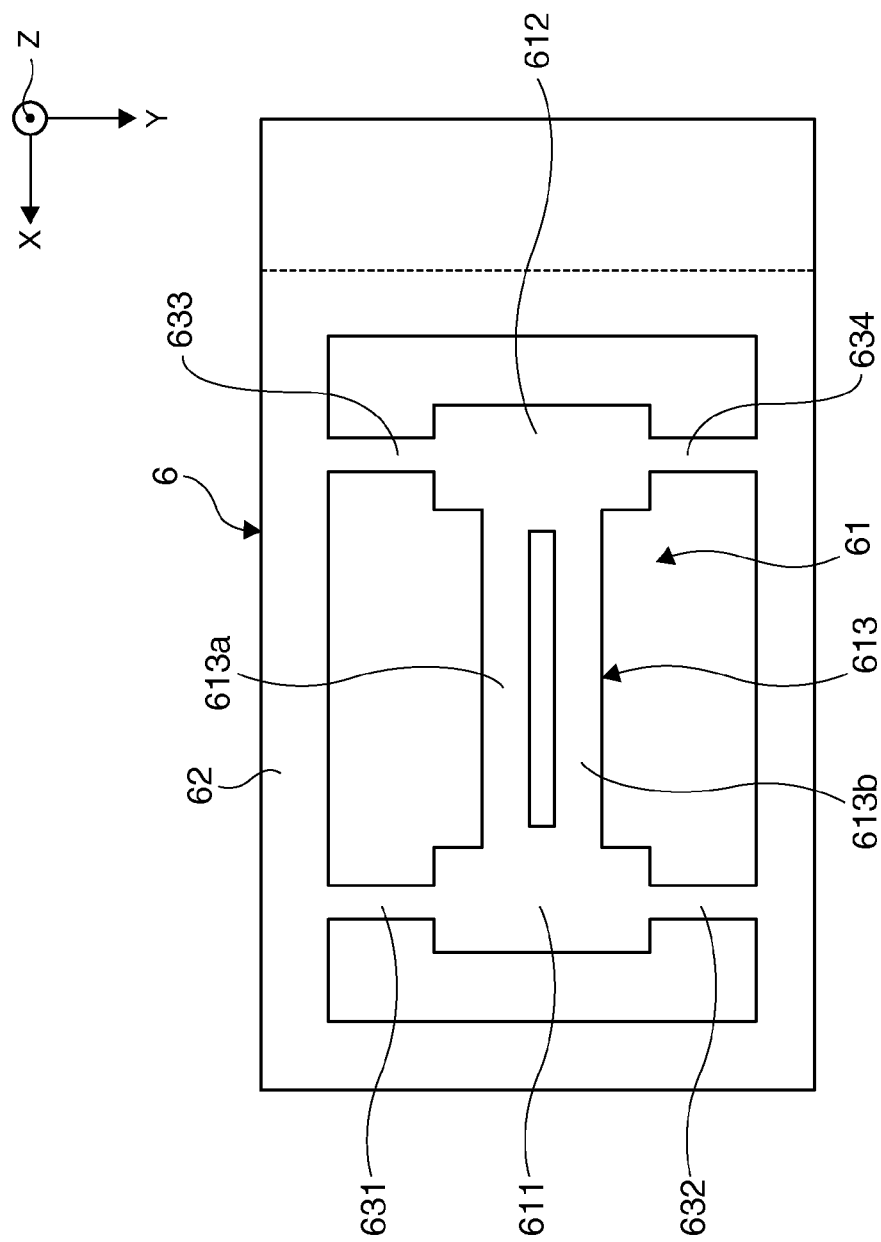
FIG. 4 is a plan view illustrating a piezoelectric vibration element layer of the sensor chip shown in FIG. 3.
Figure 6A:
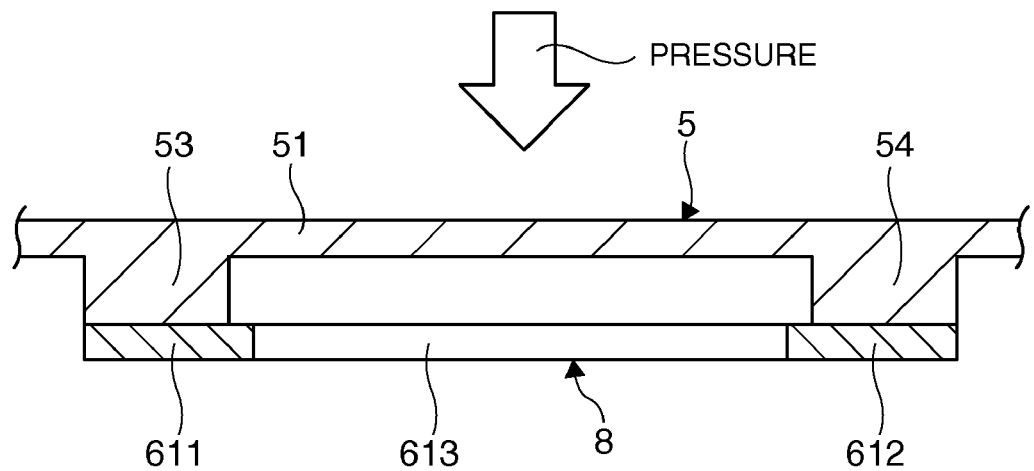
FIGS. 6A and 6B are sectional views illustrating the behavior of the sensor chip.
Figure 6B:
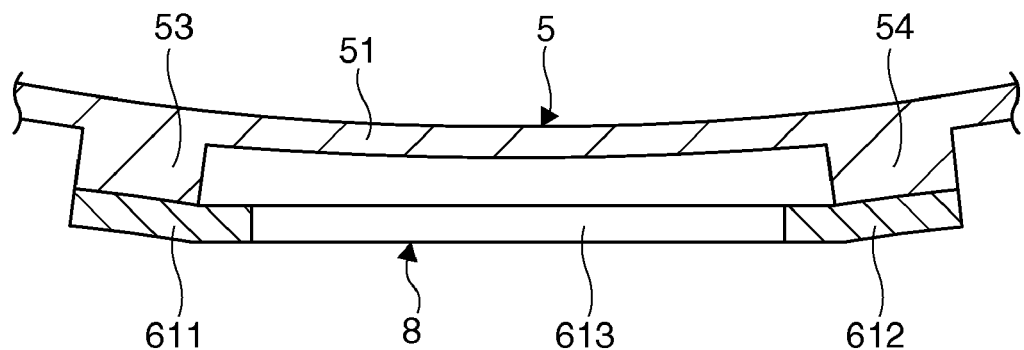
Figure 7:
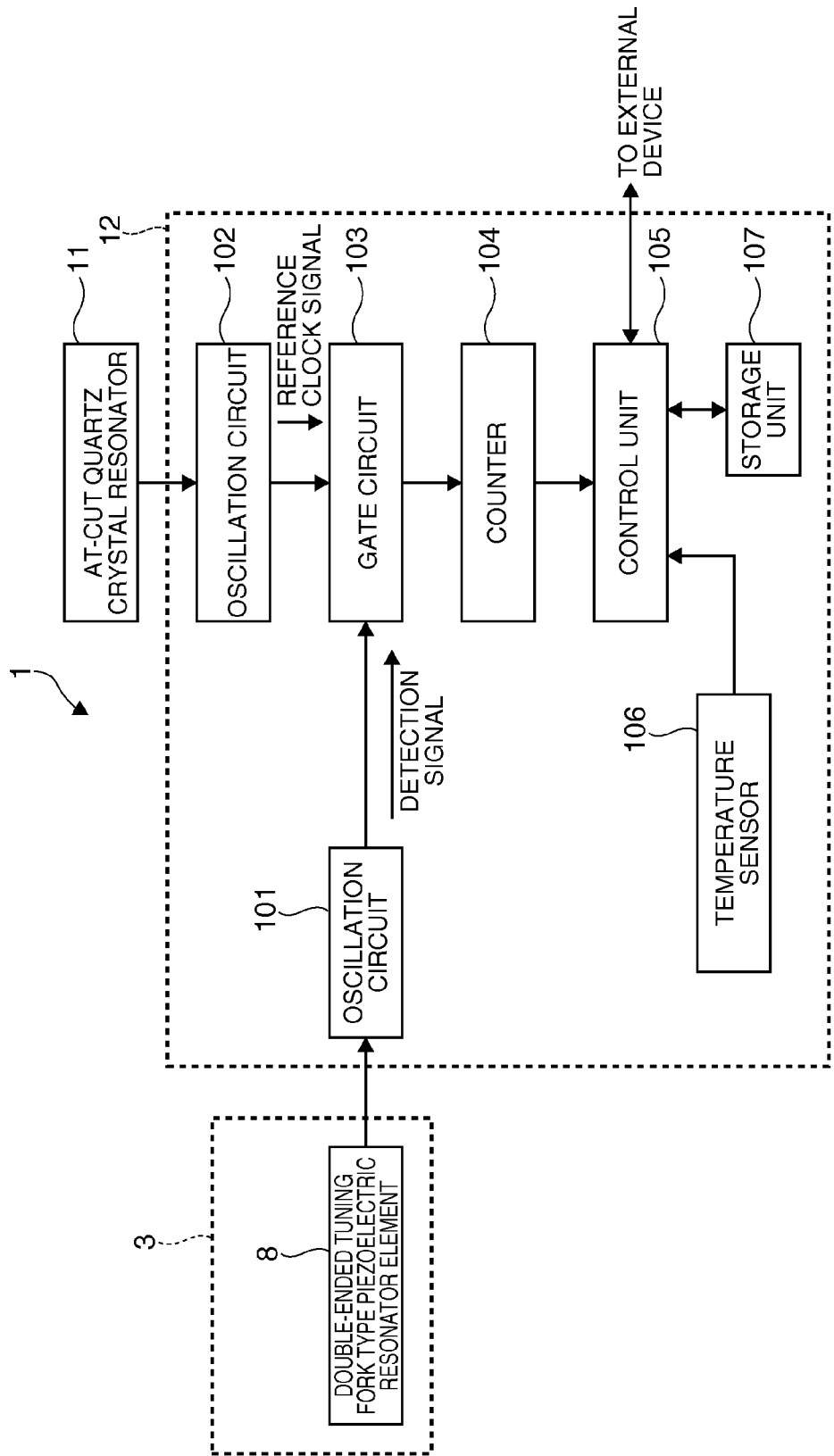
FIG. 7 is a block diagram illustrating the circuit configuration of the pressure sensor shown in FIG. 1.
Figure 8:
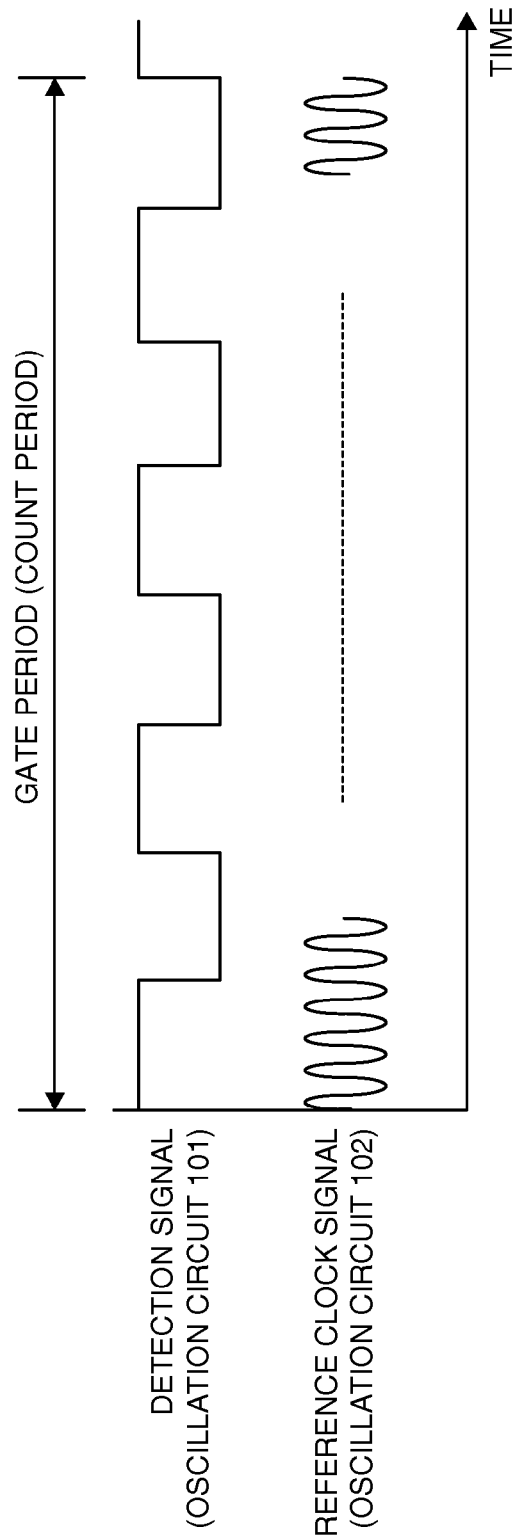
FIG. 8 is a timing diagram illustrating a reciprocal counting method in the pressure sensor shown in FIG. 1.
Figure 10:
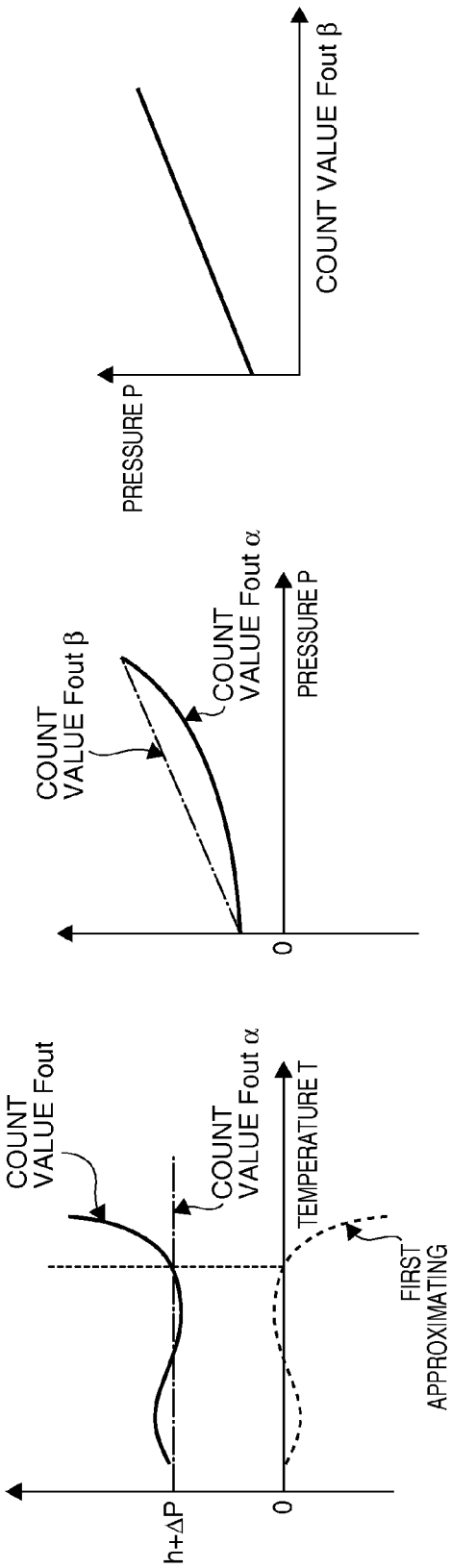
FIGS. 10F to 10H are graphs illustrating the correction of the count value of the reference clock signal in the pressure sensor shown in FIG. 1.
Figure 11:
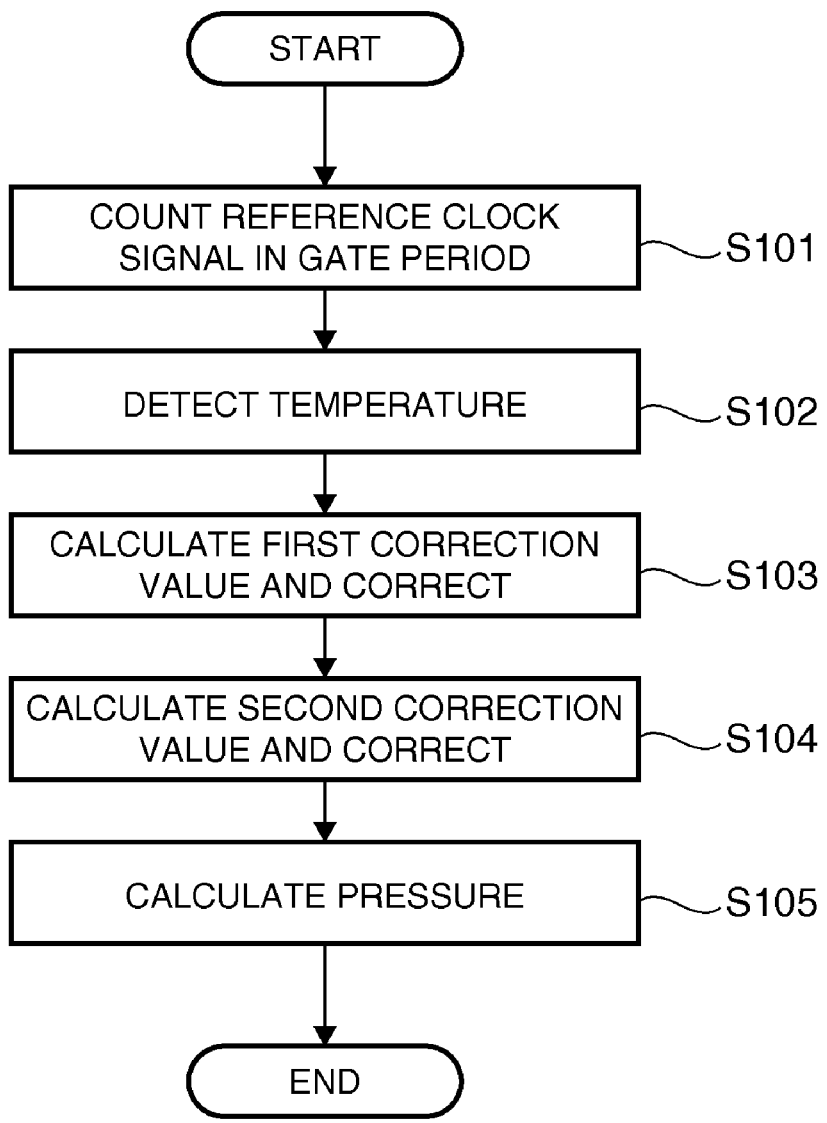
FIG. 11 is a flow diagram illustrating a control operation in the pressure sensor shown in FIG. 1.

FIG. 1 is a sectional view illustrating a pressure sensor employing a pressure detecting device according to a first embodiment of the invention. FIG. 2 is a plan view illustrating a sensor chip of the pressure sensor shown in FIG. 1. FIG. 3 is a sectional view (a sectional view taken along line A-A of FIG. 2) of the sensor chip shown in FIG. 2. FIG. 4 is a plan view illustrating a piezoelectric vibration element layer of the sensor chip shown in FIG. 3. FIGS. 5A to 5D are perspective views illustrating a double-ended tuning fork type piezoelectric vibration element of the sensor chip shown in FIG. 3. FIGS. 6A and 6B are sectional views illustrating the behavior of the sensor chip. FIG. 7 is a block diagram illustrating the circuit configuration of the pressure sensor shown in FIG. 1. FIG. 8 is a timing diagram illustrating a reciprocal counting method in the pressure sensor shown in FIG. 1. FIGS. 9A to 9E are graphs illustrating the correction of a count value of a reference clock signal in the pressure sensor shown in FIG. 1. FIGS. 10F to 10H are graphs illustrating the correction of the count value of the reference clock signal in the pressure sensor shown in FIG. 1. FIG. 11 is a flow diagram illustrating a control operation in the pressure sensor shown in FIG. 1.

In the following description, the upside in FIGS. 1, 3, and 7 is defined as "top" and the downside is defined as "bottom" (which is true in FIGS. 12 and 13). As shown in FIG. 1, two axes perpendicular to each other in a plan view of a pressure sensor are defined as an X axis and a Y axis and an axis perpendicular to both the X axis and the Y axis is defined as a Z axis. The direction parallel to the X axis is defined as an "X axis direction", the direction parallel to the Y axis is defined as a "Y axis direction", and the direction parallel to the Z axis is defined as a "Z axis direction" (which is true of the other drawings). The X axis direction corresponds to the longitudinal direction of a sensor chip and the Y axis direction corresponds to a transverse direction of the sensor chip.

Figure 12:
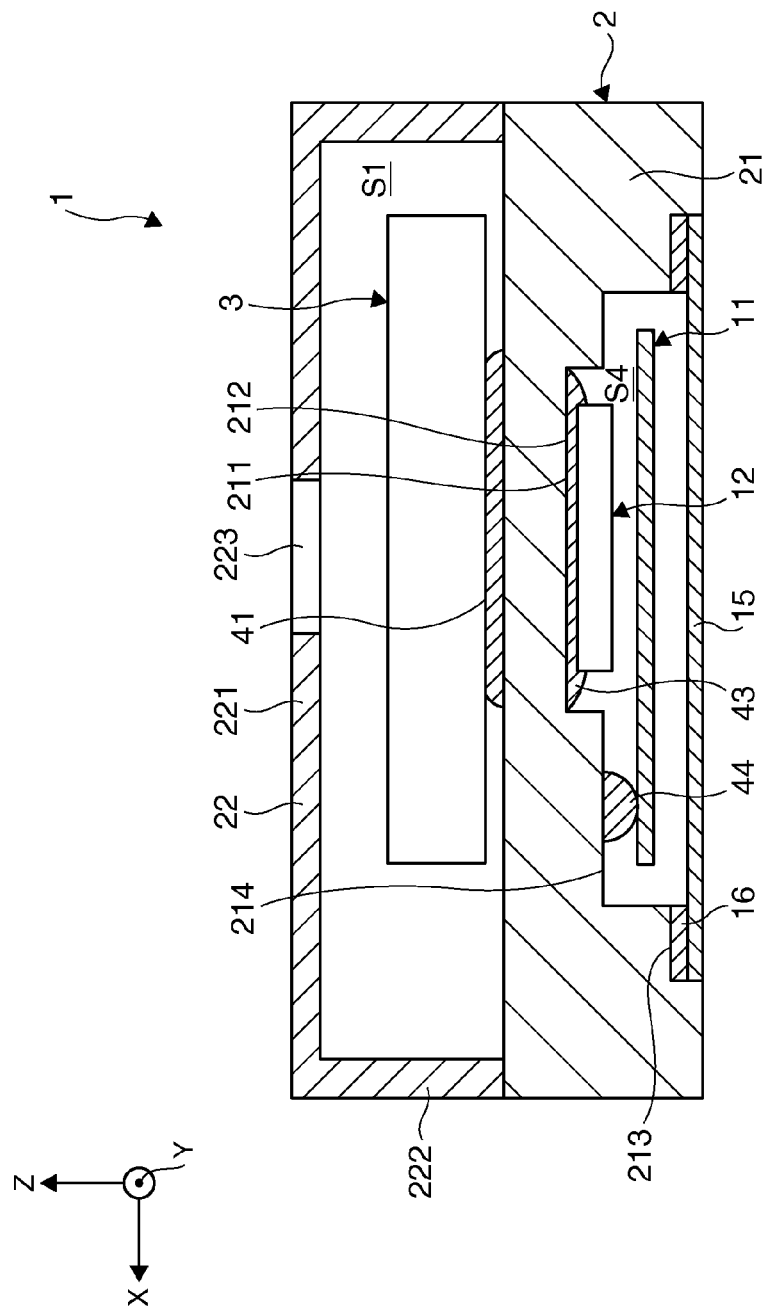
FIG. 12 is a sectional view illustrating a pressure sensor employing a pressure detecting device according to a second embodiment of the invention.
Figure 13:
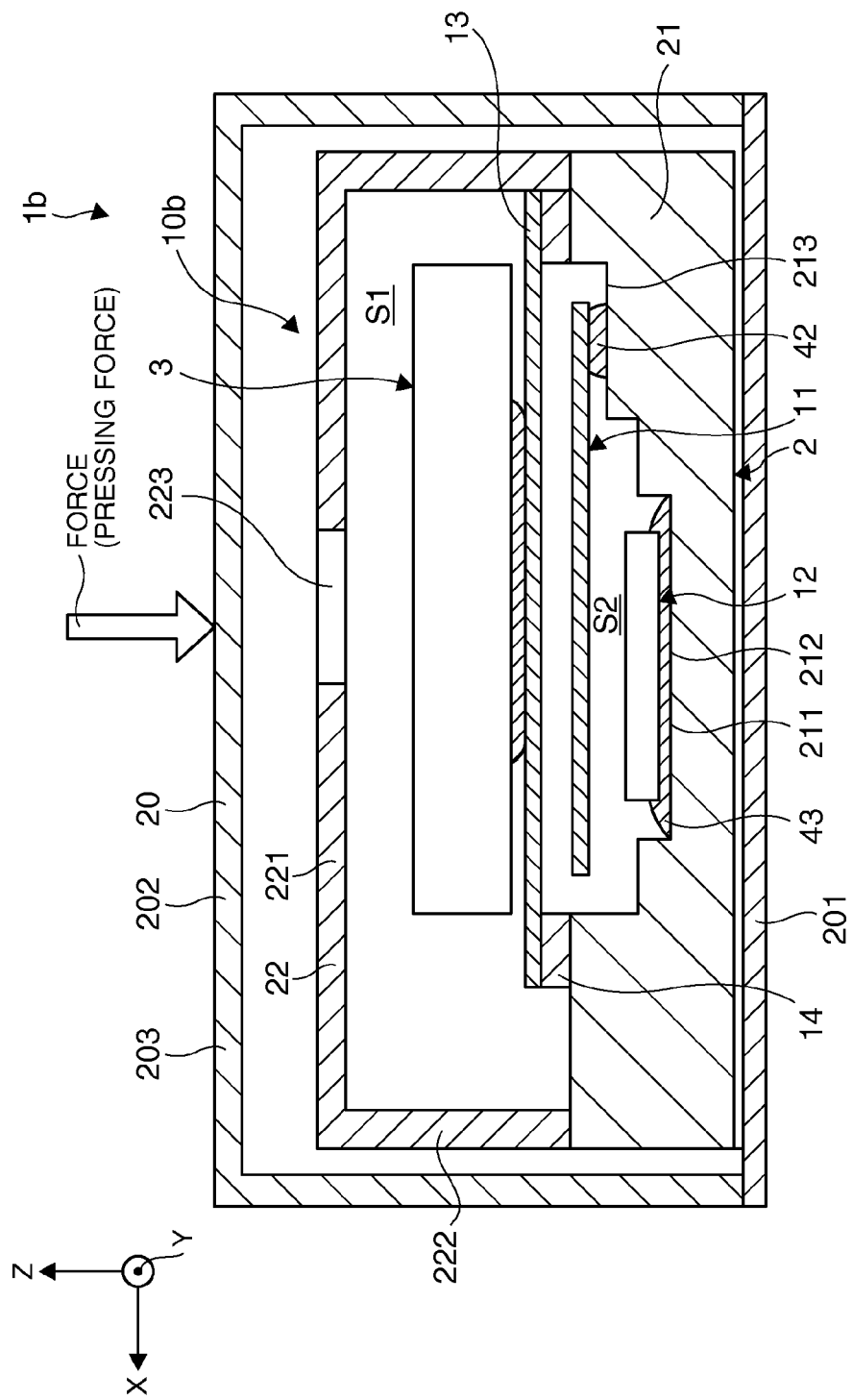
FIG. 13 is a sectional view illustrating a pressure sensor employing a pressure detecting device according to a third embodiment of the invention.

In FIG. 1, a sensor chip, an AT-cut quartz crystal resonator, and an IC chip are partially schematically illustrated (which is true of FIGS. 12 and 13).

In FIG. 1, wires, lines, electrodes, and terminals are not shown (which is true of FIGS. 12 and 13).

The pressure sensor (pressure detecting device) 1 shown in FIG. 1 is a sensor (device) detecting a pressure. In the invention, the pressure to be detected includes the pressure or force applied, for example, by gas, liquid (fluid), powder, and solid.

As shown in FIG. 1, the pressure sensor 1 includes a package 2, a sensor chip (sensor element) 3 received in the package 2, an AT-cut quartz crystal resonator (thickness-shear resonator) 11, and an IC chip 12. The constituent elements of the pressure sensor 1 will be sequentially described below.

The shape in a plan view (the shape in the XY plane) of the package 2 is a rectangle whose longitudinal direction is the X axis direction. The shape in the plan view of the package 2 is not limited to this shape, but may be a circle, a square, polygons having five or more angles, or irregular shapes.

The package 2 includes a base (main body) 21 and a lid (cover member) 22 bonded to each other. The bonding method of the base 21 and the lid 22 is not particularly limited and for example, an epoxy adhesive may be used. In addition, various bonding methods such as an anodic bonding method or a direct bonding method may be used depending on the materials of the base 21 and the lid 22.

The base 21 has a flat panel shape and a concave portion 211 is formed at the center of the top of the base 21. The concave portion 211 is formed in three stages.

The material of the base 21 is not particularly limited. Preferable examples thereof include insulating materials like various ceramics of oxide ceramics such as alumina, silica, titania, and zirconia and nitride ceramics such as silicon nitride, aluminum nitride, and titanium nitride and various resin materials such as polyethylene, polyamide, polyimide, polycarbonate, acrylic resin, ABS resin, and epoxy resin. Accordingly, it is possible to obtain a package 2 having excellent mechanical strength. A pair of electrodes (not shown) formed on the base 21 can be simply insulated from each other.

The pair of electrodes (conductor portion) formed on the base 21 has a function of electrically connecting the inside of the package 2 to the outside. The IC chip 12 can be electrically connected to an external device via the pair of electrodes.

The material of the electrodes is not particularly limited as long as it has a substantially conductive property. Examples thereof include various conductive materials like metal materials such as gold, silver, copper, aluminum, and alloy thereof, carbon materials such as carbon black, electron-conductive polymer materials such as polyacetylene, polyfluorene, and derivatives thereof, ion-conductive polymer materials in which ionic materials such as NaCl and $Cu(CF_3SO_3)_2$ are dispersed in a matrix resin such as polyvinyl alcohol and polycarbonate, and conductive oxide materials such as indium oxide (IO), indium tin oxide (ITO), and fluorine-doped tin oxide (FTO). These materials may be used singly or by combination of two or more kinds.

The lid 22 includes a top wall 221 having a flat panel shape and a frame portion 222 having a frame shape protruding downward from the edges of the top wall 221, and forms a box shape (square shape). The lid 22 is disposed on the base 21. The opening of the lid 22 is covered with the base 21. Accordingly, a space (cavity) S1 surrounded with the base 21 and the inner walls of the lid 22 is formed. A through-hole 223 allowing the inside of the package 2 communicates with the outside, that is, allowing the space S1 to communicate with the outside of the pressure sensor 1, is formed in the lid 22. Accordingly, the pressure of the space S1 can be maintained to be the same as the pressure outside the pressure sensor 1.

The material of the lid 22 is not particularly limited. Examples thereof include various ceramics of oxide ceramics such as alumina, silica, titania, and zirconia and nitride ceramics such as silicon nitride, aluminum nitride, and titanium nitride, various resin materials such as polyethylene, polyamide, polyimide, polycarbonate, acrylic resin, ABS resin, and epoxy resin, and various metal materials (including alloy) such as iron, copper, and aluminum.

The concave portion 211 of the base 21 is covered with the lid (cover member) 13 with a seam ring 14 interposed therebetween. The opening of the concave portion 211 is closed with the lid 13. Accordingly, a space (cavity) S2 surrounded with the lid 13, the seam ring 14, and the inner walls of the base 21 is formed.

The space S2 is closed, that is, air-tightly sealed. It is preferable that the space S2 is in a vacuum state or the space S2 is filled with helium gas. The AT-cut quartz crystal resonator 11 and the IC chip 12 are received in the space S2. Accordingly, it is possible to prevent the influence of the variation in pressure on the AT-cut quartz crystal resonator 11, thereby improving the precision in measuring a pressure.

The material of the lid 13 is not particularly limited. Examples thereof include various ceramics of oxide ceramics such as alumina, silica, titania, and zirconia and nitride ceramics such as silicon nitride, aluminum nitride, and titanium nitride, various resin materials such as polyethylene, polyamide, polyimide, polycarbonate, acrylic resin, ABS resin, and epoxy resin, and various metal materials (including alloy) such as iron, copper, and aluminum.

The method of bonding the base 21, the seam ring 14, and the lid 13 is not particularly limited. For example, various bonding methods such as a welding method can be used.

Examples of the method of setting the space S2 to a vacuum state include a method of bonding the lid 13, the seam ring 14, and the base 21 in vacuum (under a vacuum environment) or a method of forming a through-hole in the base 21, bonding the lid 13, the seam ring 14, and the base 21 under the ordinary pressure, then making the space S2 be in vacuum using the through-hole, filling the through-hole with a filler (for example, gold tin (AuSn) or gold germanium (AuGe)), and closing the through-hole. The same is true of the method of filling the space S2 with helium gas.

The IC chip 12 is mounted into the package 2. Specifically, the IC chip 12 is received in the space S2 of the package 2 and is fixed to the first-stage portion (the deepest portion) 212 from the bottom of the concave portion 211 of the base 21 with an adhesive 43. The adhesive 43 is not particularly limited, as long as it can bond the IC chip 12 to the package 2. For example, adhesives such as epoxy and polyimide can be used.

The IC chip 12 is electrically connected to a double-ended tuning fork type piezoelectric vibration element (the double-ended tuning fork type resonator) 8 to be described later as a pressure-sensitive element of the sensor chip 3 and the AT-cut quartz crystal resonator 11 via wires not shown. The details of the IC chip 12 will be described later.

As shown in FIG. 1, the AT-cut quartz crystal resonator 11 is mounted into the package 2. Specifically, the AT-cut quartz crystal resonator 11 is received in the space S2 of the package 2 so as not to come in contact with other members such as the inner walls of the package 2, the IC chip 12, the seam ring 14, and the lid 13. An end of the AT-cut quartz crystal resonator 11 is fixed to the third-stage portion (shallowest portion) 213 from the bottom of the concave portion 211 of the base 21 with an adhesive 42. The adhesive 42 is not particularly limited, as long as it can bond the AT-cut quartz crystal resonator 11 to the package 2. For example, adhesives of epoxy, polyimide, silicone, and the like can be used.

The AT-cut quartz crystal resonator 11 is electrically connected to an oscillation circuit 102 of the IC chip 12.

The sensor chip 3 includes a double-ended tuning fork type piezoelectric vibration element (double-ended tuning fork type resonator) 8 which is a resonator whose oscillation frequency (resonance frequency) varies depending on internal stress (tensile stress or compressive stress) generated in a pressure-sensing unit as a pressure-sensitive element and is mounted into the package 2. Specifically, the sensor chip 3 is received in the space S1 of the package 2 so as not to come in contact with the inner walls of the package 2 and the lid 13 and is fixed to the lid 13 with an adhesive 41. The adhesive 41 is not particularly limited, as long as it can bond the sensor chip 3 to the package 2. For example, adhesives such as epoxy and polyimide can be used.

As shown in FIG. 2, the shape in a plan view (the shape in the XY plane) of the sensor chip 3 is a rectangle whose longitudinal direction is the X axis direction. The sensor chip 3 having such a shape is placed in the package 2 so that the longitudinal direction thereof is parallel to the longitudinal direction of the package 2. Accordingly, the space S1 of the package 2 can be efficiently utilized, thereby accomplishing the decrease in size of the pressure sensor 1.

As shown in FIG. 3, the sensor chip 3 includes a diaphragm 5, a piezoelectric vibration element layer 6, and a base member 7, which are sequentially stacked from the upside of FIG. 3. The sensor chip 3 includes a protrusion 31 formed by extending the piezoelectric vibration element layer 6 and the base member 7 in the X axis direction from the diaphragm 5.

The diaphragms, the piezoelectric vibration element layer 6, and the base member 7 are formed of quartz crystal. In this way, since the diaphragm 5, the piezoelectric vibration element layer 6, and the base member 7 are formed of the same material, it is possible to suppress unintentional warp or twist of the piezoelectric vibration element body 61 resulting from the difference in linear expansion coefficient, thereby improving the precision in measuring a pressure. It is also possible to suppress the unintentional warp or twist of the sensor chip 3 and to suppress the generation of cracks resulting therefrom. By forming the piezoelectric vibration element layer 6 out of quartz crystal, it is possible to obtain a sensor chip 3 having excellent temperature characteristic and vibration characteristic.

For example, by the use of low-melting-point glass or an epoxy adhesive, the diaphragm 5 and the piezoelectric vibration element layer 6 are bonded to each other and the piezoelectric vibration element layer 6 and the base member 7 are bonded to each other. Accordingly, it is possible to strongly bond the members. They may be bonded to each other using an anodic bonding method or a direct bonding method.

The diaphragm 5 includes a flexible thin-walled portion 51 which is deformed by a pressure from the outside (pressure from the upside in FIG. 3) and a frame portion 52 formed around the thin-walled portion 51. That is, the diaphragm 5 has a concave portion opened at the center other than the edge of the bottom to form a box shape (square shape) whose bottom is thin-walled.

The diaphragm 5 includes a pair of support portions 53 and 54 formed on the bottom surface (surface close to the base member 7) of the thin-walled portion 51. The piezoelectric vibration element body 61 (the double-ended tuning fork type piezoelectric vibration element 8) (to be described later) of the piezoelectric vibration element layer 6 is fixed to the pair of support portions 53 and 54.

The base member 7 is disposed to face the diaphragm 5. The base member 7 includes a base portion 71 having plate-like shape and a frame portion 72 protruding upright from the edge of the base portion 71. That is, the base member 7 forms a box shape (square shape) having a concave portion opened at the center other than the edge of the top surface. The concave portion formed in the base member 7 is opposed to the concave portion formed in the diaphragm 5 to form a space S3. The double-ended tuning fork type piezoelectric vibration element 8 is received in the space S3.

It is preferable that the space S3 is in vacuum. Accordingly, it is possible to lower the CI (Crystal Impedance) value of the double-ended tuning fork type piezoelectric vibration element 8, thereby improving the stability in frequency. Examples of the method of setting the space S3 to a vacuum state include a method of bonding the diaphragm 5, the piezoelectric vibration element layer 6, and the base member 7 in vacuum (under a vacuum environment) or a method of forming a through-hole in the base member 7, bonding the diaphragm 5, the piezoelectric vibration element layer 6, and the base member 7 under the ordinary pressure, then making the space S3 be in vacuum using the through-hole, filling the through-hole with a filler (for example, gold tin (AuSn) or gold germanium (AuGe)), and closing the through-hole.

The piezoelectric vibration element layer 6 is disposed to be interposed between the base member 7 and the diaphragm 5. As shown in FIG. 4, the piezoelectric vibration element layer 6 includes a piezoelectric vibration element body 61, a rim-like frame portion 62 disposed to surround the piezoelectric vibration element body 61, and four connecting portions 631, 632, 633, and 634 connecting the piezoelectric vibration element body 61 to the frame portion 62.

The piezoelectric vibration element body 61 includes a pair of base portions 611 and 612 disposed apart from each other and a double-ended turning fork type vibration portion 613 connecting the base portions 611 and 612. The vibration portion 613 includes two vibration beams (pillar-like beams) 613a and 613b having a rectangular shape and extending in the X axis direction to be parallel to each other with a gap therebetween. Since two vibration beams 613a and 613b are provided, it is possible to suppress the vibration leakage of the vibration portion 613 and thus to obtain a sensor chip 3 having an excellent resolution. The number of vibration beams is not limited to two in this embodiment, but may be one or three or more.

The base portions 611 and 612 of the piezoelectric vibration element body 61 are fixed to the support portions 53 and 54 of the diaphragm 5. The method of fixing the base portions 611 and 612 to the support portion 53 is not particularly limited. For example, they may be bonded using low-melting-point glass or epoxy adhesive.

The frame portion 62 is disposed to surround the piezoelectric vibration element body 61 and the inner shape and the outer shape thereof are rectangular.

The connecting portions 631 and 632 of four connecting portions 631 to 634 connect the base portion 611 of the piezoelectric vibration element body 61 to the frame portion 62 and the connecting portions 633 and 634 connect the base portion 612 to the frame portion 62. The four connecting portions 631 to 634 are disposed to extend in the Y axis direction. The number of connecting portions and the extending direction thereof are not particularly limited, as long as it can connect the piezoelectric vibration element body 61 to the frame portion 62. For example, one or three or more connecting portions may be formed in the respective base portions 611 and 612.

The configurations (shapes) of the diaphragm 5, the piezoelectric vibration element layer 6, and the base member 7 have been described, but the outer shapes can be formed from a single quartz crystal plate, for example, using a photolithography method and various etching methods such as a dry etching method or a wet etching method.

A pair of excitation electrodes 91 and 92 shown in FIGS. 5A to 5D is formed in the piezoelectric vibration element body 61. The piezoelectric vibration element body 61 and the pair of excitation electrodes 91 and 92 constitute the double-ended tuning fork type piezoelectric vibration element 8. The double-ended tuning fork type piezoelectric vibration element 8 has excellent sensitivity to the tensile stress and the compressive stress and excellent resolution as a pressure-sensitive element. Accordingly, the sensor chip 3 including the double-ended tuning fork type piezoelectric vibration element 8 can exhibit excellent pressure detectability.

A pair of excitation electrodes 91 and 92 is disposed to vibrate in a vibration mode in which the vibration mode of the double-ended tuning fork type piezoelectric vibration element 8 is symmetric about the center axis of the double-ended tuning fork type piezoelectric vibration element 8.

Figure 5A:
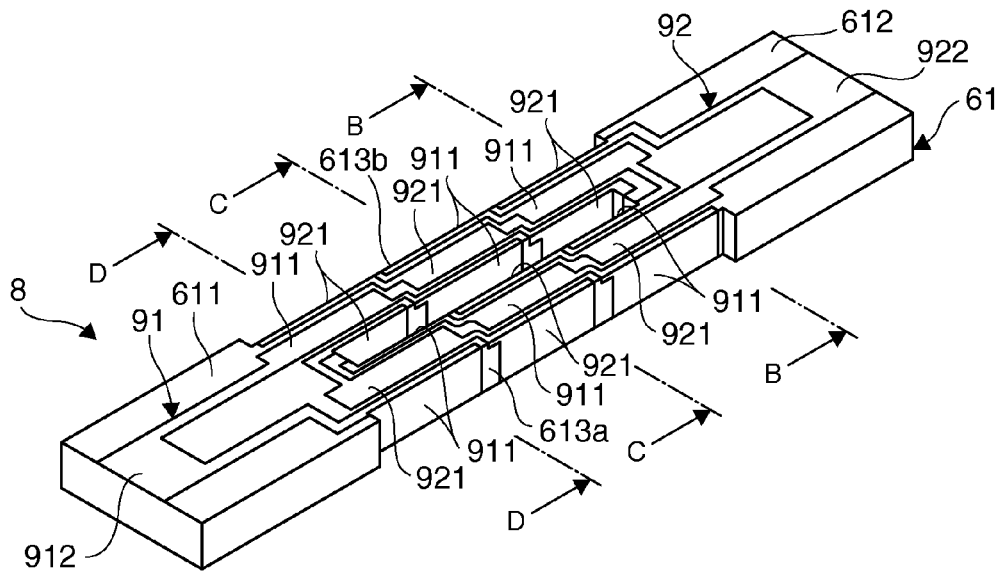
FIGS. 5A to 5D are perspective views illustrating a double-ended tuning fork type piezoelectric vibration element of the sensor chip shown in FIG. 3.
Figure 5B:
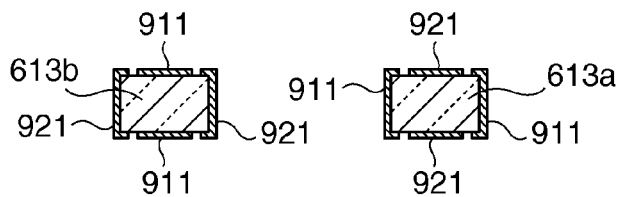
Figure 5C:
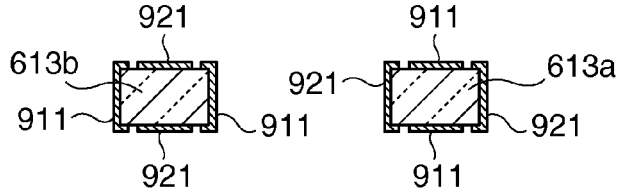
Figure 5D:
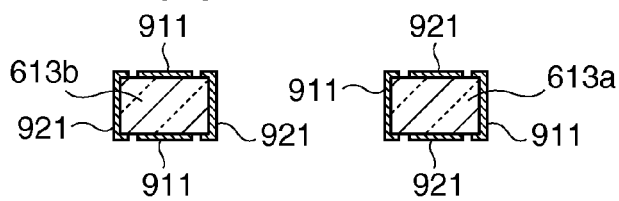

FIG. 5A is a perspective view of the double-ended tuning fork type piezoelectric vibration element 8 as viewed from the base member 7 side. FIGS. 5B to 5D are sectional viewed of the double-ended tuning fork type piezoelectric vibration element 8. As shown in FIGS. 5A to 5D, the excitation electrode 91 includes plural electrode pieces 911 formed on the vibration beams 613a and 613b and a drawn electrode 912 formed on the base portion 611, which are electrically connected to each other. Similarly, the excitation electrode 92 includes plural electrode pieces 921 formed on the vibration beams 613a and 613b and a drawn electrode 922 formed on the base portion 612, which are electrically connected to each other. The drawn electrodes 912 and 922 are formed on the surface of the piezoelectric vibration element layer 6 close to the base member 7.

The electrode pieces 911 and 921 are alternately arranged in the longitudinal direction and the peripheral direction of the vibration beams 613a and 613b and are inversely arranged in the vibration beam 613a and the vibration beam 613b. By employing this electrode arrangement, it is possible to efficiently allow the double-ended tuning fork type piezoelectric vibration element 8 to vibrate in the above-mentioned vibration mode.

The excitation electrode 91 is electrically connected to the terminal 95 formed on the protrusion 31 via a wire formed on the connecting portion 631 and the frame portion 62. The terminal 95 is electrically connected to the IC chip 12 via a conductive wire 97 and a wire not shown.

The excitation electrode 92 is electrically connected to the terminal 96 formed on the protrusion 31 via a wire formed on the connecting portion 634 and the frame portion 62. The terminal 96 is electrically connected to the IC chip 12 via a conductive wire 98 and a wire not shown.

The materials of the excitation electrodes 91 and 92, the terminals 95 and 96, and the wires are not particularly limited as long as they are substantially conductive. For example, the same material as the pair of electrodes formed on the base 21 can be used.

In the pressure sensor 1 (sensor chip 3), when the pressure shown in FIG. 6A is applied to the pressure-receiving face of the diaphragm 5, the thin-walled portion 51 of the diaphragm 5 warps so as to enlarge the bottom surface (the bonding surface to the double-ended tuning fork type piezoelectric vibration element 8) of two support portions 53 and 54 as shown in FIG. 6B. With the warp of the thin-walled portion 51, a force in the warping direction and a force in the extending direction (in the longitudinal direction) due to the enlargement width between the pair of support portions 53 and 54 are applied to the double-ended tuning fork type piezoelectric vibration element 8 fixed to the support portions 53 and 54. That is, the tensile stress (extensional stress) is generated in the double-ended tuning fork type piezoelectric vibration element 8. The double-ended tuning fork type piezoelectric vibration element 8 has such a characteristic that the oscillation frequency (resonance frequency) is raised when the tensile stress is applied to the vibration beams 613a and 613b of the vibration portion 613. Accordingly, the magnitude of the pressure applied to the pressure sensor 1 (sensor chip 3) can be obtained by detecting the oscillation frequency of the double-ended tuning fork type piezoelectric vibration element 8 and using the detected value of the oscillation frequency, as described later. When compressive stress is generated in the double-ended tuning fork piezoelectric vibration element 8, the oscillation frequency of the double-ended tuning fork piezoelectric vibration element 8 is lowered.

Here, the magnitude of the pressure applied to the pressure sensor 1 depends on values having a predetermined relation with the oscillation frequency, for example, a count value (measured value) counted by the counter 104 of the reference clock signal in the oscillation period or the gate period to be described later, in addition to the oscillation frequency. In this embodiment, the pressure is calculated on the basis of the count value.

The resonator as a pressure-sensitive element is not limited to the double-ended tuning fork type piezoelectric vibration element 8, but a resonator whose oscillation frequency (resonance frequency) varies depending on the pressure, that is, a resonator whose oscillation frequency varies depending on the tensile stress (extensional stress) and the compressive stress, may be used. In addition, for example, a tuning fork type resonator, an AT resonator, a SAW resonator, and the like can be used.

The IC chip 12 will be described below.

As shown in FIG. 7, the IC chip 12 includes an oscillation circuit (first oscillation circuit) 101 that oscillates the double-ended tuning fork type piezoelectric vibration element 8 and outputs a signal of a frequency corresponding to the pressure which is received via the pressure-receiving face of the diaphragm by the double-ended tuning fork type piezoelectric vibration element 8, an oscillation circuit (second oscillation circuit) 102 that oscillates the AT-cut quartz crystal resonator 11 and outputs a reference clock signal, a gate circuit 103 that generates a gate period, a counter 104, a control unit (control unit) 105, a temperature sensor (temperature detecting unit) 106 that detects a temperature of the double-ended tuning fork type piezoelectric vibration element 8 or around the double-ended tuning fork type piezoelectric vibration element 8, and a storage unit (storage unit) 107.

In the pressure sensor 1, at the time of measuring (detecting) a pressure, the double-ended tuning fork type piezoelectric vibration element 8 is excited (oscillated) by the use of the oscillation circuit 101 and the AT-cut quartz crystal resonator 11 is excited (oscillated) by the use of the oscillation circuit 101, thereby generating the reference clock signal. The signal (hereinafter, also referred to as "detection signal") output from the oscillation circuit 102 and the reference clock signal output from the oscillation circuit 102 are input to the gate circuit 103. The frequency of the reference clock signal is known.

The gate circuit 103 sets the gate period in counting (measuring) the reference clock signal using the reciprocal counting method at the time of measuring (detecting) a pressure. That is, the detection signal is input to the gate circuit 103, and the gate circuit 103 sets the gate period on the basis of the period of the detection signal and outputs a timing signal representing the gate period to the counter 104. As shown in FIG. 8, the gate period is set to an integer multiple of the period of the detection signal (a value corresponding to plural periods).

The reference clock signal is input to the gate circuit 103 and is then input to the counter 104 from the gate circuit 103.

The counter 104 counts (measures) the reference clock signal in the gate period using the reciprocal counting method at the time of measuring a pressure (see FIG. 8). The count value (measured value) of the reference clock signal is input to the control unit 105. The measuring unit is constituted by the gate circuit 103 and the counter 104.

The control unit 105 is constituted, for example, by a micro computer including a CPU, a ROM, and a RAM and performs various calculating processes in the pressure sensor 1 or entirely controls the pressure sensor 1.

Specifically, at the time of measuring a pressure, the control unit 105 acquires the pressure received by the double-ended tuning fork type piezoelectric vibration element 8 on the basis of the count value obtained by counting the reference clock signal in the gate period by the use of the counter 104 (hereinafter, also simply referred to as "count value of the reference clock signal"). At this time, the correction process is performed using a first approximating polynomial and a second approximating polynomial to be described later. The main functions of the pressure calculating unit, the first correction unit, and the second correction unit are implemented by the control unit 105.

The temperature sensor 106 detects the temperature of the double-ended tuning fork type piezoelectric vibration element 8 or the temperature around the double-ended tuning fork type piezoelectric vibration element 8. In this embodiment, the temperature in the package 2, that is, the temperature around the double-ended tuning fork type piezoelectric vibration element 8, is detected by the temperature sensor 106. The information of the detected temperature is input to the control unit 105 and is used for the correction.

The storage unit 107 includes a storage medium storing a variety of information such as data, operational expressions, tables, and programs. The storage medium includes a variety of semiconductor memories (IC memories) of a volatile memory such as a RAM, a nonvolatile memory such as a ROM, a rewritable (erasable and writable) nonvolatile memory such as an EPROM, an EEPROM, and a flash memory. The storage unit 107 stores various operational expressions such as the first approximating polynomial and the second approximating polynomial (to be described later) used to measure a pressure. The coefficients of the first approximating polynomial and the second approximating polynomial may be stored therein.

The writing (storing), the rewriting, the erasing, and the reading with respect to the storage unit 107 are controlled by the control unit 105.

Here, the double-ended tuning fork type piezoelectric vibration element 8 and the AT-cut quartz crystal resonator 11 have such a frequency-temperature characteristic that the oscillation frequency (resonance frequency) thereof varies depending on the temperature.

Accordingly, in the pressure sensor 1, the control unit 105 corrects the count value of the reference clock signal on the basis of the detection value of the temperature detected by the temperature sensor 106 at the time of measuring a pressure so as to compensate for the frequency-temperature characteristic of the double-ended tuning fork piezoelectric vibration element 8 and the frequency-temperature characteristic of the AT-cut quartz crystal resonator 11. In this correction, the first approximating polynomial representing the relation between a first correction value of the count value of the reference clock signal and the temperature (the temperature detected by the temperature sensor 106) of the double-ended tuning fork type piezoelectric vibration element 8 is used to compensate for the frequency-temperature characteristic of the AT-cut quartz crystal resonator 11 and the frequency-temperature characteristic of the double-ended tuning fork type piezoelectric vibration element 8. That is, at the time of correction, the first correction value is calculated using the first approximating polynomial on the basis of the temperature detected by the temperature sensor 106 and then the count value of the reference clock signal is corrected using the first correction value.

The first approximating polynomial includes the frequency-temperature characteristic of the AT-cut quartz crystal resonator 11 in addition to the frequency-temperature characteristic of the double-ended tuning fork type piezoelectric vibration element 8. Accordingly, compared with the case where the frequency-temperature characteristic of the double-ended tuning fork type piezoelectric vibration element 8 and the frequency-temperature characteristic of the AT-cut quartz crystal resonator 11 are individually compensated for, it is possible to simplify the operational processes and the control.

The degree of the first approximating polynomial is not particularly limited, but is preferably three or more, more preferably four or more, and still more preferably four to six.

The reason is as follows. Since the graph representing the frequency-temperature characteristic of the double-ended tuning fork type piezoelectric vibration element 8 is a quadratic curve, the degree of the first approximating polynomial is preferably two or more. Since the graph representing the frequency-temperature characteristic of the AT-cut quartz crystal resonator 11 is a cubic curve, the degree of the first approximating polynomial is preferably three or more. In consideration of both cases, the degree of the first approximating polynomial is preferably three or more. Accordingly, it is possible to further improve the precision in measuring a pressure.

The coefficients of the first approximating polynomial are calculated in advance by measurement and calculations and are stored in the storage unit 107. The first approximating polynomial will be described in more detail later.

The graph representing the relation (the pressure-frequency characteristic of the double-ended tuning fork type piezoelectric vibration element 8) between the pressure received by the double-ended tuning fork type piezoelectric vibration element 8 (sensor chip 3) and the frequency of the detection signal, that is, the graph representing the relation between the pressure received by the double-ended tuning fork type piezoelectric vibration element 8 and the count value of the reference clock signal, is not linear. In other words, the pressure received by the double-ended tuning fork type piezoelectric vibration element 8 is not proportional to the frequency of the detection signal, that is, the pressure received by the double-ended tuning fork type piezoelectric vibration element 8 is not proportional to the count value of the reference clock signal.

Therefore, in the pressure sensor 1, the control unit 105 additionally corrects the count value of the reference clock signal, which has been corrected using the first correction value, using the second approximating polynomial (compensates for the pressure-frequency characteristic of the double-ended tuning fork type piezoelectric vibration element 8). The second approximating polynomial is used to correct the count value of the reference clock signal corrected using the first correction value so that the corrected count value of the reference clock signal is proportional to the pressure received by the double-ended tuning fork type piezoelectric vibration element 8. Accordingly, it is possible to further improve the precision in measuring a pressure. The coefficients of the second approximating polynomial are acquired by measurement and calculations in advance and are stored in the storage unit 107. The second approximating polynomial will be described in more detail later.

The degree of the second approximating polynomial is not particularly limited, but is preferably three or more, more preferably four or more, and still more preferably four to six.

The reason is as follows. The pressure-frequency characteristic of the double-ended tuning fork type piezoelectric vibration element 8 includes a second degree of components. Accordingly, the degree of the second approximating polynomial is preferably two or more to remove the second degree of components and is preferably three or more to perform the correction with higher precision. Accordingly, it is possible to further improve the precision in measuring a pressure.

The correcting of the count value of the reference clock signal will be described below. Here, it is assumed that the degree of the first approximating polynomial and the degree of the second approximating polynomial are three.

Figure 9:
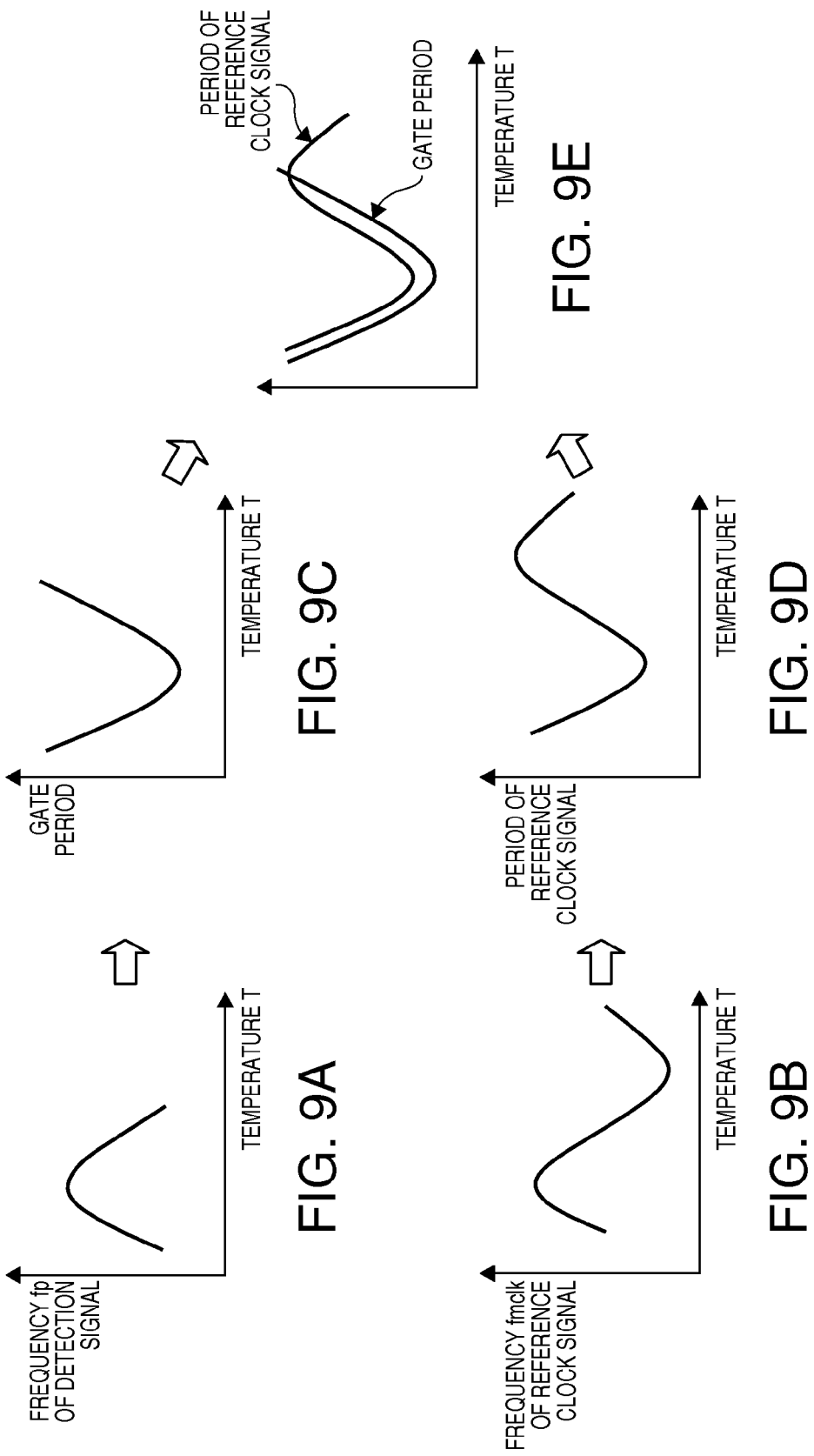
FIGS. 9A to 9E are graphs illustrating the correction of a count value of a reference clock signal in the pressure sensor shown in FIG. 1.

The graph representing the relation between the frequency fp of the detection signal and the temperature T is as shown in FIG. 9A and the graph representing the relation between the frequency fmclk of the reference clock signal and the temperature T is as shown in FIG. 9B.

The graph representing the relation between the gate period and the temperature T is as shown in FIG. 9C and the graph representing the relation between the period of the reference clock signal and the temperature T is as shown in FIG. 9D.

By superposing the graph representing the relation between the gate period and the temperature T and the graph representing the relation between the period of the reference clock signal and the temperature T, the graph shown in FIG. 9E is obtained.

The graph representing the relation between the count value Fout of the reference clock signal and the temperature T is indicated by a solid line in FIG. 10F.

The count value Fout is not subjected to a first correction and a second correction and is expressed by Expression (1), where P represents the pressure received by the double-ended tuning fork type piezoelectric vibration element 8 and T represents the temperature.

$$Fout = e \cdot T^3 + f \cdot T^2 + g \cdot T + h + \Delta(P) \quad (1)$$

$\Delta(P)$ is a term depending on the pressure, h is a term not depending on the pressure and the temperature, the terms of "$e \cdot T^3 + f \cdot T^2 + g \cdot T^3$" depend on the temperature, and e, f, and g are coefficients.

The first approximating polynomial f(T) is used to subtract the values of corresponding to the terms of "$e \cdot T^3 + f \cdot T^2 + g \cdot T$" and is indicated by a broken line in the graph shown in FIG. 10F.

The first approximating polynomial f(T) can be expressed by Expression (2).

$$f(T) = -e \cdot T^3 - f \cdot T^2 - g \cdot T \quad (2)$$

The expression representing the count value Fout$\alpha$ obtained by correcting the count value Fout using the first correction value is "$h + \Delta(P)$" which is obtained by adding Expression (2) to Expression (1) and is indicated by a one-dot chained line in the graph shown in FIG. 10F.

The coefficients e, f, g, and h in Expression (2) are acquired in advance by measurement and calculation for each pressure sensor 1 and are stored in the storage unit 107. The coefficients e, f, g, and h can be acquired, for example, as follows.

First, under a constant pressure, the temperatures of four or more points are measured and the count values Fout are measured. The coefficients e, f, g, and h in Expression (2) are calculated using the measured temperatures, the count values Fout, and Expression (1) and, for example, using the least square method.

The graph representing the relation between the count value Foutα and the pressure P is indicated by a solid line in FIG. 10G.

The count value Foutα is subjected to the first correction using the first correction value and is not subjected to the second correction, and is expressed by Expression (3) when P represents the pressure received by the double-ended tuning fork type piezoelectric vibration element 8.

$$Fout\alpha = h + \Delta(P) \quad (3)$$

Here, the count value Foutα includes a pressure-dependent term $\Delta(P)$.

Accordingly, Foutβ is calculated by further correcting the count value Foutα using the second approximating polynomial.

$$Fout\beta = k \cdot (Fout\alpha)^3 + l \cdot (Fout\alpha)^2 + m \cdot (Fout\alpha) + n \quad (4)$$

Here, k, l, m, and n are correction constants.

Expression (4) is introduced to set a proportional relation between Foutβ and the pressure P received by the double-ended tuning fork type piezoelectric vibration element 8.

Foutβ obtained from Expression (4) is converted into a pressure using Expression (5).

$$P = q \cdot Fout\beta \quad (5)$$

Here, q is a conversion constant.

Expression (4) (the second approximating polynomial) is used to improve the linearity of the characteristic of the count value Foutα with respect to the pressure P and corresponds to a one-dot chained line in the graph shown in FIG. 10G.

The coefficients k, l, and m and the constant n in Expression (4) are acquired in advance by measurement and calculation for each pressure sensor 1 and are stored in the storage unit 107. The coefficients k, l, and m and the constant n can be acquired, for example, as follows.

First, under a constant temperature, the pressures of four or more points are measured and the count values Fout are acquired. The count value Foutα is calculated and the coefficients k, l, and m and the constant n in Expression (4) are calculated using the pressures, the count values Foutα, and Expression (4) and, for example, using the least square method.

The operation of the pressure sensor 1 at the time of detecting a pressure will be described with reference to the flow diagram shown in FIG. 11. Here, it is assumed that the degree of the first approximating polynomial and the degree of the second approximating polynomial are three.

First, the reference clock signal in the gate period is counted to acquire the count value Fout by the use of the counter 104 (step S101).

The temperature around the double-ended tuning fork type piezoelectric vibration element 8 is detected by the use of the temperature sensor 106 (step S102). Any of step S101 and step S102 may be first performed.

Then, the first correction value is calculated and the count value Fout of the reference clock signal is corrected using the first correction value (step S103). In step S103, the detected temperature is first introduced into Expression (2) to calculate the first correction value. The first correction value is added to the count value Fout. Accordingly, the count value Foutα which is obtained by correcting the count value Fout using the first correction value can be acquired.

Subsequently, in step S104, the acquired count value Foutα is corrected using the second approximating polynomial (step S104). In step S104, the count value Foutα acquired in step S103 is introduced into Expression (4) to calculate Foutβ.

Subsequently, the count value Foutβ is introduced into Expression (5) to calculate the pressure P (step S105).

As described above, since the pressure sensor 1 can compensate for both the frequency-temperature characteristic of the double-ended tuning fork type piezoelectric vibration element 8 and the frequency-temperature characteristic of the AT-cut quartz crystal resonator 11, it is possible to improve the precision in measuring a pressure.

Since the frequency-temperature characteristic of the double-ended tuning fork type piezoelectric vibration element 8 and the frequency-temperature characteristic of the AT-cut quartz crystal resonator 11 can be inclusively compensated for using the first approximating polynomial, it is possible to simplify the operational processes and the control, compared with the case where the frequency-temperature characteristic of the double-ended tuning fork type piezoelectric vibration element 8 and the frequency-temperature characteristic of the AT-cut quartz crystal resonator 11 are individually compensated for.

Compared with the case where the TCXO including the temperature-compensating IC is used as the reference clock oscillator, it is possible to lower the power consumption.

In the AT-cut quartz crystal resonator 11, the oscillation frequency (resonance frequency) is higher than that of the tuning fork type resonator or the double-ended tuning fork type resonator. The AT-cut quartz crystal resonator 11 is oscillated to generate the reference clock signal and the reference clock signal is counted using the reciprocal counting method, whereby the pressure is calculated. Accordingly, it is possible to reduce the time required to measure a pressure.

When the tuning fork type resonator or the double-ended tuning fork type resonator is used as a source of the reference clock signal in the reciprocal counting method, a circuit multiplying a signal is necessary. In this case, power is necessary for operating the circuit, thereby increasing the power consumption. On the contrary, in the pressure sensor 1, since the AT-cut quartz crystal resonator 11 having a relatively high frequency is used, the circuit multiplying a signal is not necessary, thereby decreasing the power consumption.

The method of calculating the pressure P is not limited to the above-mentioned method, but may be performed as follows.

That is, a reduction expression of the pressure Pa in the state where the frequency-temperature characteristic and the pressure-frequency characteristic are not compensated for may be directly acquired from Expression (1) and the correction may be performed to cancel the second-degree and third-degree terms from the acquired reduction expression of the pressure Pa. Expression (6) is a reduction expression of the pressure Pb in the state where the frequency-temperature characteristic is compensated for. Expression (7) is a reduction expression of the pressure P in the state where the frequency-temperature characteristic and the pressure-frequency characteristic are compensated for.

$$Pb = h_1 + k_1 \cdot Fout^3 + l_1 \cdot Fout^2 + m_1 \cdot Fout \quad (6)$$

$$P = h_1 + m_1 \cdot Fout \quad (7)$$

Although it is described in the above-mentioned embodiment that the control unit 105 and the storage unit 107 are built in the IC chip 12 and the correction of the count value Fout of the counter 104 and the calculation of the pressure are performed inside the pressure sensor 1, the invention is not limited to this configuration. The processes of correcting the count value Fout of the counter 104 and calculating the pressure may be performed outside the pressure sensor 1.

For example, some functions (the correction and the pressure calculation) of the control unit 105 and the storage unit 107 may be disposed in an external device and the processes of correcting the count value Fout of the counter 104 and calculating the pressure may be performed by the external device.

Alternatively, some functions (the correction and the pressure calculation) of the control unit 105 may be disposed in an external device and the storage unit 107 may be disposed in the IC chip 12. That is, the coefficients of the first approximating polynomial stored in the storage unit 107 or the coefficients of the first approximating polynomial and the second approximating polynomial may be read from the external device and the processes of correcting the count value Fout of the counter 104 and calculating the pressure may be performed by the external device. In this case, a circuit performing the correction and pressure calculating processes is not necessary in the pressure sensor 1 and thus the circuit scale of the IC chip 12 is reduced and the power consumption is thus reduced. As a result, it is possible to accomplish a decrease in cost.

Second Embodiment

FIG. 12 is a sectional diagram illustrating a pressure sensor employing a pressure detecting device according to a second embodiment of the invention.

The differences of the second embodiment from the above-mentioned first embodiment will be mainly described below and the same elements or configurations will not be described.

As shown in FIG. 12, in the pressure sensor 1 according to the second embodiment, a concave portion 211 is formed at the center of the bottom of the base 21.

The lid (cover member) 15 is bonded to a third-stage portion 213 from the bottom of the concave portion 211 of the base 21 with the seam ring 16 interposed therebetween and the opening of the concave portion 211 is covered with the lid 15. Accordingly, a space (cavity) S4 surrounded with the lid 15, the seam ring 16, and the inner walls of the base 21 is formed.

Similarly to the space S2 in the first embodiment, the space S4 is closed, that is, air-tightly sealed. It is preferable that the space S4 is in a vacuum state or the space S4 is filled with helium gas.

The material of the lid 15 is not particularly limited. For example, the same material as that of the lid 13 in the first embodiment can be used.

The IC chip 12 is mounted into the package 2. Specifically, the IC chip 12 is received in the space S4 of the package 2 and is fixed to the first-stage portion 212 from the bottom of the concave portion 211 of the base 21 with an adhesive 43.

The AT-cut quartz crystal resonator 11 is mounted into the package 2. Specifically, the AT-cut quartz crystal resonator 11 is received in the space S4 of the package 2 so as not to come in contact with other members such as the inner walls of the package 2, the IC chip 12, the seam ring 16, and the lid 15. An end of the AT-cut quartz crystal resonator 11 is fixed to the second-stage portion 214 from the bottom of the concave portion 211 of the base 21 with an adhesive 44. The adhesive 44 is not particularly limited, as long as it can bond the AT-cut quartz crystal resonator 11 to the package 2. For example, the same adhesive as the adhesive 42 in the first embodiment can be used.

The sensor chip 3 is mounted into the package 2. Specifically, the sensor chip 3 is received in the space S1 of the package 2 so as not to come in contact with the inner walls of the package 2 and is fixed to the base 21 with an adhesive 41.

The same advantage as the first embodiment can be exhibited in the second embodiment of the invention.

Third Embodiment

FIG. 13 is a sectional diagram illustrating a pressure sensor employing a pressure detecting device according to a third embodiment of the invention.

The differences of the third embodiment from the above-mentioned first embodiment will be mainly described below and the same elements or configurations will not be described.

As shown in FIG. 13, a pressure (pressing force) sensor 1b according to the third embodiment includes a pressure sensor body 10b and a package (second package) 20 receiving the pressure sensor body 10b therein.

The structure of the pressure sensor body 10b is the same as the structure of the pressure sensor 1 according to the first embodiment. The control is different, in that the pressure sensor 1 measures an atmospheric pressure but the pressure sensor body 10b finally measures a force (pressing force) applied to the package 20.

The package 20 includes a base (body) 201 and a deformable lid (cover member) 202 which are bonded to each other. The inside of the package 20 is closed (air-tightly sealed). The pressure sensor 1b is fixed to the bottom of the package 20. Gaps are formed between the side and top of the pressure sensor body 10b and the package 20. Particularly, since a gap is formed between the top of the pressure sensor body 10b and the package 20, it is possible to prevent the top of the package 20 from coming in contact with the top of the pressure sensor body 10b when the top of the package 20 is pressed at the time of measurement, thereby preventing the decrease in measuring precision.

The operation of the pressure sensor 1b will be described.

First, for example, when the top wall 203 of the lid 202 of the package 20 in the pressure sensor 1b is pressed down with a finger or the like, the top wall 203 of the lid 202 of the package 20 is curved so that the lower surface thereof is convex and thus the pressure in the package 20 is raised. In the pressure sensor body 10b, the correction processes are performed similarly to the above-mentioned pressure sensor 1 to calculate the pressure in the package 20 and the pressing force applied to the lid of the package 20 is calculated on the basis of the pressure.

The calibration curve (for example, an operational expression or a table) representing the relation between the pressure in the package 20 and the pressing force is experimentally acquired in advance and is stored in the storage unit 107.

The same advantage as described in the first embodiment can be exhibited in the third embodiment.

The lid 22 of the package 2 and the package 20 may be removed so that the diaphragm 5 is directly pressed with a finger or the like.

The third embodiment can be applied to the second embodiment.

While the pressure detecting device according to the invention has been described with reference to the embodiments shown in the drawings, the invention is not limited to the embodiments. The constituent elements may be replaced with other elements having the same functions. Any other constituent element may be added to the invention.

The invention may be embodied by combining two or more configurations (features) of the above-mentioned embodiments.

The entire disclosure of Japanese Patent Application Nos: 2010-071112, filed Mar. 25, 2010 and 2011-033579, filed Feb. 18, 2011 are expressly incorporated by reference herein.

What is claimed is:

1. A pressure detecting device comprising:
    a resonator whose oscillation frequency varies depending on a pressure;
    a first oscillation circuit that oscillates the resonator and outputs a signal of a frequency corresponding to the pressure;
    an AT-cut quartz crystal resonator;
    a second oscillation circuit that oscillates the AT-cut quartz crystal resonator and outputs a reference clock signal;
    a measuring unit that measures the reference clock signal in a gate period based on the period of the signal output from the first oscillation circuit by the use of a reciprocal counting method;
    a temperature detecting unit that detects a temperature of the resonator or around the resonator; and
    a storage unit that stores coefficients of a first approximating polynomial for calculating a first correction value used to compensate for a frequency-temperature characteristic of the measuring unit,
    wherein the frequency-temperature characteristic of the value measured by the measuring unit includes a frequency-temperature characteristic of the AT-cut quartz crystal resonator and a frequency-temperature characteristic of the resonator.

2. The pressure detecting device according to claim 1, wherein the first correction value is calculated on the basis of the detection result of the temperature detecting unit and the first approximating polynomial, and
    the pressure detecting device further comprises a first correction unit that corrects the value measured by the measuring unit by the use of the first correction value.

3. The pressure detecting device according to claim 1, wherein coefficients of a second approximating polynomial are stored in the storage unit,
    the pressure detecting device further comprises a second correction unit that additionally corrects the measured value corrected by the use of the first correction value on the basis of the second approximating polynomial, and
    the second approximating polynomial is used to additionally correct the measured value corrected by the use of the first correction value so that the resultant value corrected by the second correction unit is proportional to the pressure.

4. The pressure detecting device according to claim 1, wherein the degree of the first approximating polynomial is three or more.

5. The pressure detecting device according to claim 1, wherein the degree of the second approximating polynomial is three or more.

6. The pressure detecting device according to claim 1, wherein the AT-cut quartz crystal resonator is disposed in a closed space.

7. The pressure detecting device according to claim 1, wherein the resonator is a double-ended tuning fork type resonator.

* * * * *